United States Patent
Taylor

(10) Patent No.: US 6,855,294 B2
(45) Date of Patent: Feb. 15, 2005

(54) APPARATUS AND METHODS FOR EFFICIENT GENERATION OF CHLORINE DIOXIDE

(75) Inventor: Rodney D. Taylor, Binger, OK (US)

(73) Assignee: Resonance, Inc., Missoula, MT (US)

( * ) Notice: Subject to any disclaimer, the term of this patent is extended or adjusted under 35 U.S.C. 154(b) by 233 days.

(21) Appl. No.: 10/001,897

(22) Filed: Nov. 21, 2001

(65) Prior Publication Data

US 2002/0061263 A1 May 23, 2002

Related U.S. Application Data

(60) Provisional application No. 60/253,024, filed on Nov. 22, 2000.

(51) Int. Cl.$^7$ .............................. G05D 1/00; G05D 7/00
(52) U.S. Cl. ..................... 422/105; 422/108; 422/110; 422/111; 422/188; 422/189; 422/190; 422/191; 422/193; 422/196; 422/197
(58) Field of Search ............................. 423/477, 478; 422/105, 108, 110, 111, 188, 189, 190, 191, 193, 196, 197

(56) References Cited

U.S. PATENT DOCUMENTS

| | | | |
|---|---|---|---|
| 3,931,737 A | * 1/1976 | Conkling et al. | 73/861.55 |
| 4,247,531 A | 1/1981 | Hicks | 423/477 |
| 4,250,144 A | 2/1981 | Ratigan | 422/112 |
| 4,451,444 A | * 5/1984 | Santillie et al. | 423/480 |
| 4,590,057 A | * 5/1986 | Hicks | 423/477 |
| 4,978,517 A | 12/1990 | Norell et al. | 423/479 |
| 5,006,326 A | 4/1991 | Mayurnik et al. | 423/477 |
| 5,008,096 A | 4/1991 | Ringo | 423/477 |
| 5,091,166 A | 2/1992 | Engström et al. | 423/478 |
| 5,091,167 A | 2/1992 | Engström et al. | 423/478 |
| 5,106,541 A | 4/1992 | Fristad et al. | 554/213 |
| 5,192,459 A | 3/1993 | Tell et al. | 252/106 |
| 5,204,081 A | * 4/1993 | Mason et al. | 423/478 |
| 5,258,171 A | 11/1993 | Eltomi | 423/477 |
| 5,756,721 A | 5/1998 | Eden et al. | 536/127 |
| 5,855,861 A | * 1/1999 | Lee | 423/477 |
| 5,895,638 A | 4/1999 | Tenney | 423/478 |
| 5,968,454 A | 10/1999 | Deacon et al. | 422/120 |
| 6,051,135 A | 4/2000 | Lee et al. | 210/192 |
| 6,121,451 A | 9/2000 | Henegar et al. | 546/92 |

* cited by examiner

*Primary Examiner*—Glenn Caldarola
*Assistant Examiner*—Alexis Wachtel
(74) *Attorney, Agent, or Firm*—Pate Pierce & Baird, P.C.

(57) ABSTRACT

An apparatus and methods for chlorine dioxide generation. The chlorine dioxide apparatus may comprise a plurality of metering pumps for delivering a plurality of reactant chemicals. The reactant chemicals are preferably delivered to a reaction column through inlet ports where the reactants are mixed to form the desired reactants. A synchronizer may control the metering pump action to provide synchronized delivery of the plurality of reactant chemicals to the reaction column.

24 Claims, 5 Drawing Sheets

APPARATUS AND METHODS FOR EFFICIENT GENERATION OF CHLORINE DIOXIDE

RELATED APPLICATION

This application claims the benefit of U.S. Provisional Application Ser. No. 60/253,024, filed Nov. 22, 2000, and entitled "APPARATUS AND METHODS FOR EFFICIENT GENERATION OF CHLORINE DIOXIDE" which is hereby incorporated herein by reference.

BACKGROUND

1. Field of the Invention

The present invention generally relates to the production of chlorine dioxide and, more particularly, to novel apparatus and methods for increasing the efficiency of chlorine dioxide production utilizing metering pumps and a multiport reaction column under vacuum.

2. The Background

Chlorine was traditionally used as a chemical disinfectant to inactivate or chemically kill microorganisms in drinking water. Certain chlorinated, brominated or poly-substituted organic compounds may result, however, from the interaction of chlorine with natural organic matter in raw water supplies. Some of these compounds (i.e., trihalomethanes and the haloacetic acids formed by reactions between free chlorine and natural organic matter) have been linked with undesirable environmental side effects and potential long term health effects, such as cancer.

Chlorine dioxide, having the molecular formula of $ClO_2$, has been found to not form these halogenated byproducts when it reacts with the same precursors as those produced with chlorine. Importantly, chlorine dioxide has been found to produce microbiologically safe water that is chemically disinfected without the high cost of ozone or causing the production of chlorine-related harmful halogenated byproducts. Thus, the bactericidal, fungicidal, algicidal, bleaching and deodorizing properties of chlorine dioxide are readily used by those skilled in the art for chemically disinfecting and treating water sources, without incurring the adverse environmental side effects that are associated with chlorine.

Unfortunately, chlorine dioxide is hazardous due to the unstable nature of gaseous chlorine dioxide when compressed, therefore chlorine dioxide does not lend itself to large scale factory production. It is necessary to produce chlorine dioxide on site rather than to produce it at a plant and ship it for usage when needed. As appreciated, chlorine dioxide generators and processes were developed by those skilled in the art to produce chlorine dioxide on site in the select quantities needed, thus allowing for limited production without the problems associated with large scale production, transportation and/or storage of the substance.

Although chlorine dioxide does produce inorganic byproducts (e.g., chlorine, chlorite, chlorate, chlorous acid, chloride ions and the like), these byproducts may be ultimately removed if proper procedures and protocols are followed. Whereas, the capability to effectively handle and remove disinfection byproducts produced by the process, the dramatic reduction of organic products produced as a result of the process, and the strong disinfection strength of chlorine dioxide makes it the better candidate for disinfecting and treating water sources. To this end, chlorine dioxide is presently used for disinfecting water, controlling taste and odor, color reduction, and for the oxidation of inorganic compounds like iron, manganese or sulfur compounds that generally detract from the aesthetic quality of the water.

Chlorine dioxide, acting as a disinfectant, may be used in both the pre-oxidation and the post-oxidation stages of water treatment. By adding chlorine dioxide in the pre-oxidation phase of the purification of surface water, the growth of bacteria and algae may be controlled in subsequent phases of treatment. Chlorine dioxide also acts as an oxidant (electron receiver) to colloidal substances, aiding in the coagulation process and improving the removal of turbidity.

In summary, chlorine dioxide may be used as a disinfectant and an oxidant in the treatment of drinking water. Chlorine dioxide may therefore be utilized in a variety of processes including a large number of bactericidal applications, especially in the field of water treatment in wastewater treatment facilities, odor abatement of raw sewage and the control of hydrogen sulfide in sewers.

The difficulties involved in the generation of chlorine dioxide can be demarcated into three specific groupings: (1) the production of chlorine dioxide in an appropriate carrier fluid; (2) the production of chlorine dioxide in the right concentration with the absence of unwanted byproducts or compounds; and (3) maximizing percent yield. Correspondingly, many prior art chlorine dioxide generation apparatus and methods have been developed by those skilled in the art in an effort to address many of the difficulties or disadvantageous associated with chlorine dioxide production.

For example, those skilled in the art developed a process for producing chlorine dioxide by reacting in a reaction vessel an alkali metal chlorate, a mineral acid, and methanol as a reducing agent in proportions to generate chlorine dioxide in a reaction medium that is maintained at a temperature of about 50° C. to about 100° C. and at an acidity within the interval from about 2 to about 11 N and subjected to a subatmospheric pressure. Water is evaporated and a mixture of chlorine dioxide, water vapor and gaseous byproducts is withdrawn from an evaporation region in the reaction vessel. The alkali metal sulphate is preferably precipitated in a crystallization region in the reaction vessel. The content of formic acid in the reaction vessel is increased by the addition of formic acid to a content of formic acid exceeding about 0.3 M. The gaseous byproducts are condensed to obtain formic acid and the content of formic acid in the reaction vessel is increased by recirculation of the condensate.

Another prior art apparatus and method was developed by those skilled in the art for forming an aqueous chlorine dioxide solution that includes reacting in a reaction vessel an acid reaction solution containing a hydroxy carboxylic acid and a companion acid with an alkali metal salt of a chlorite ion. The hydroxy carboxylic acid serves to temporarily transfer chlorine from and does not form a salt with the alkali metal salt of the chlorite ion. The apparatus includes a stripping unit whereby product solution is contacted with an inert gas to produce a product gas, and an absorbing unit whereby the product gas is contacted with an aqueous medium to produce an aqueous solution of chlorine dioxide.

Of the above listed challenges associated with prior art apparatus and methods for chlorine dioxide generation, perhaps the most difficult to solve is maximizing percent yield. Economics dictate that the profit of a production process is maximized when all the inputs are used to completion without excess or waste, while requiring the shortest amount of time possible. In chemical reactions, the inputs are referred to as reactants, the end products are referred to simply as the products.

Those skilled in the art refer to theoretical yield as the maximum possible generation of a product with a given quantity of reactants. In order to reach the theoretical yield, all the molecules of one reactant must find a complementary molecule of a differing reactant and combine in such a way to form the desired product. In the real world, it is very difficult to ensure that every reactant molecule comes in contact with a complement, wherein the yield of the desired product is generally referred to as the actual yield.

Percent yield may be defined as the ratio of actual yield to the theoretical yield. Thus, in an efficient chemical reaction, the actual yield approaches the theoretical yield and the resulting percent yield is high. In order to increase percent yield, it is common practice to add an excess of one reactant, thus greatly increasing the probability that all of the accompanying limiting reactant is consumed. However, this practice may be undesirable for two reasons. First, after the limiting reactant has been consumed, the excess reactant is wasted and can not be readily recovered. Second, the reactant in excess may adversely affect the characteristics of the final solution. For example, if chlorine were the excess reactant, its presence would result in the environmental side effects that were meant to be avoided. Thus, it would be an advancement in the art to develop a chlorine dioxide generation apparatus and methods that produces a high percent yield without introducing significant excesses of one or more of the reactants.

Time is also an important factor in creating an economical production process. The faster the progression of the production process, the greater the amount of product that can be produced in a given amount of time. However, an increase in the time allotted for a reaction to occur, promotes a higher percent yield. The reasoning is obvious, the more time the reactant molecules have to move about, the more probable that they will encounter a complement and react. Therefore, in order to reach an optimal economic production, there must be a compromise between the time allotted for the reaction and the resulting percent yield. To this end, it would be an advancement in the art to create a chlorine dioxide generation apparatus and methods that maximize reactant interaction thereby substantially shortening the amount of time that is required to reach optimal economic production.

Several apparatus and methods of the prior art have been directed at increasing the percent yield in chlorine dioxide generation. One such prior art chlorine dioxide generation apparatus utilizes vacuum chemical feed systems. A significant disadvantage with these types of prior art vacuum chemical feed systems is that there is a low emphasis on precise mixture of chemicals, volumetrically or symmetrically. It would therefore be an advancement in the art to have a chlorine dioxide generator that meters a precise volume of reactant chemicals synchronized and combined through internal ports with dimensions calculated to exact collision timing within a reaction column and then exiting the apparatus via a single output port. Such a device is disclosed herein.

SUMMARY AND OBJECTS OF THE INVENTION

In view of the foregoing, it is a primary object of the present invention to provide novel apparatus and methods for increasing the efficiency of chlorine dioxide production by utilizing synchronized metering pumps and a multiport reaction column under vacuum, thereby precisely metering, synchronizing, and controlling reactant introduction in an effort to achieve maximum percent yield.

It is also an object of the present invention to improve the percent yield of chlorine dioxide generation by utilizing precision volumes, linear flow paths, and precision reaction column geometry in order to take advantage of the physical laws involved in efficient molecular mixing and interaction.

It is a further object of the present invention to provide novel apparatus and methods for increasing the percent yield of chlorine dioxide production at minimal cost with minimum working components.

Consistent with the foregoing objects, and in accordance with the invention as embodied and broadly described herein, an apparatus and method are disclosed, in suitable detail to enable one of ordinary skill in the art to make and use the invention. One presently preferred embodiment of an apparatus and method, in accordance with the present invention, may include a water delivery system having an inlet water source delivering water at a sufficient pressure. If the inlet water source does not deliver the water at a desired pressure, the water delivery system may be configured with a booster pump to pressurize the inlet stream of water to the desired pressure. The water delivery system may further be configured to contain a safety mechanism to protect the hardware of a generator. The safety mechanism may be configured to be an in-line flowswitch interconnected electrically with a time delay relay. A timer may be actuated at pump start, if after a predetermined time has elapsed (e.g., 10 seconds) the flowswitch has not been actuated, a safety circuit may be provided to remove incoming voltage to the chlorine dioxide generator.

A pressure reducing valve may be incorporated into the water delivery system to determine the gallons per minute of water flowing through the generator. In one presently preferred embodiment of the present invention, the flow rate may be adjusted from 3–6 gpm according to the output requirements of the generator.

In certain embodiments, the water delivery system may be further configured to pass the water though a flow meter which may function primarily as a point of reference for determining chlorine dioxide concentration in the final output solution. A check valve may be incorporated along the length of the water delivery system to ensure that chlorine dioxide is unable to backfeed into the water delivery system. If desired, a pressure gauge may be incorporated into the delivery system to monitor the pressure. As appreciated, the pressure readout from the pressure gauge may facilitate initial setup and also be an aid in troubleshooting the generator.

In one presently preferred embodiment of the present invention, the water introduced into the water delivery system may be configured to pass through an eductor. The water flow through the eductor may be configured to produce a vacuum. In certain preferred embodiments, the eductor may be secured proximate a reaction column and the vacuum produced by the eductor may be applied to the reaction column. The vacuum produced may also be configured to be dependent upon the flow rate and pressure of the water flow through the eductor.

Preferably, the eductor is directly connected to the reaction column. The reaction column may be configured to have a plurality of inlets and an outlet port. A plurality of reactants may be introduced into the reaction column through the various inlet ports. The reaction column may be configured to promote mixing and an efficient reaction between the reactants. The efficient mixing of the reactants may be accomplished by promoting turbulent flow through the incorporation of abrupt flow path changes and head-on collision feeds into the reaction column design.

The chlorine dioxide generator of one presently preferred embodiment of the present invention may be further configured to contain a chemical feed system. The chemical feed system may be formed to deliver a plurality of reactants to the reaction column. The reactants delivered to the reaction column may be any chemicals which, when combined, react to form chlorine dioxide. In one presently preferred embodiment of the present invention, the reactants include hydrochloric acid, sodium hypochlorite and sodium chlorite which are individually delivered to the reaction column.

As will be appreciated, the reactants may be delivered to the reaction column by any suitable means. In one presently preferred embodiment, a plurality of metering pumps are employed to individually pump the reactants to the reaction column from their storage containers. The metering pumps may be configured to simultaneously and in a synchronized manner delivery precise charges, thus insuring that the reactants arrive at the reaction column in the exact proportions that are needed to allow the chemical reaction to progress to completion without an excess of any reactant. Preferably, the metering pumps may be interconnected through a repeat cycle timer to insure that all metering pump pulsations are at the exact same time.

The chemical feed system may be further configured to maintain a given backpressure to ensure repeatability of pump priming while also allowing for degassing functions, if they are required by the application. These functions may be accomplished by incorporating a four function valve in the delivery path of each of the reactants. In one presently preferred embodiment of the present invention, a second backpressure regulator may be directly coupled to the reaction column. The second backpressure regulator may be configured to promote reaction efficiency by reducing the distance the metered reactants are pumped.

After the mixing of all of the reactants has been accomplished under the conditions outlined hereinabove, the chlorine dioxide which is produced by the apparatus exits the reaction column and is preferably directed into the water flow delivered from the water delivery system. The final chlorine dioxide solution may then be delivered to a holding tank for subsequent use, as desired. In one presently preferred embodiment of the present invention, the flow path from the reaction column to the holding tank may be configured with a sight glass for visual inspection of the final product output. Moreover, the flow path from the reaction column to the holding tank may further be configured to contain a check valve which allows flow in only the desired direction and thereby prevents any unwanted backfeeding.

BRIEF DESCRIPTION OF THE DRAWINGS

The foregoing and other objects and features of the present invention will become more fully apparent from the following description, taken in conjunction with the accompanying drawings. Understanding that these drawings depict only typical embodiments of the invention and are, therefore, not to be considered limiting of its scope, the invention will be described with additional specificity and detail through use of the accompanying drawings in which.

DETAILED DESCRIPTION OF THE PREFERRED EMBODIMENTS

It will be readily understood that the components of the present invention, as generally described and illustrated in the Figures herein, could be arranged and designed in a wide variety of different configurations. Thus, the following more detailed description of the embodiments of the system and method of the present invention, as represented in FIGS. 1 through 5, is not intended to limit the scope of the invention, as claimed, but it is merely representative of the presently preferred embodiments of the invention.

Those of ordinary skill in the art will, of course, appreciate that various modifications to the details of the Figures may easily be made without departing from the essential characteristics or spirit of the invention. Thus, the following description of the Figures is intended only by way of example, and simply illustrates certain presently preferred embodiments consistent with the invention.

Figure 1:
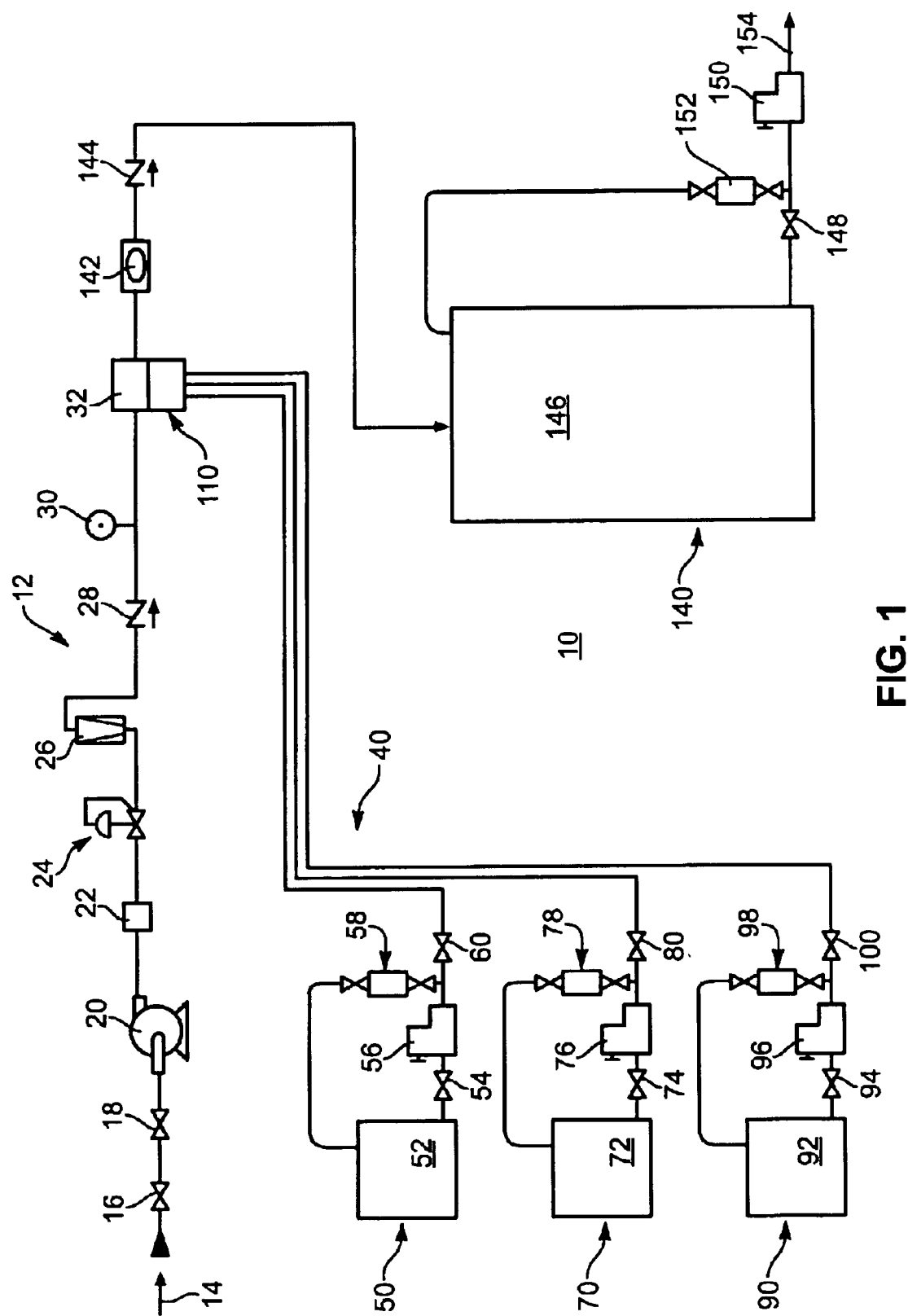
FIG. 1 is a diagrammatical representation illustrating one presently preferred embodiment of a chlorine dioxide generation apparatus and method of chlorine dioxide production of the present invention.

FIG. 1 is a schematic diagram of one presently preferred embodiment of the present invention, wherein system components are represented and connected by lines. These lines may be assumed to be any suitable conduit for transporting a given substance from one component to another.

Referring to FIG. 1, and generally to FIGS. 1–5, a chlorine dioxide generation apparatus 10 may be configured to include a water delivery system 12, a chemical feed system 40, a reaction column 110, and an output system 140. The water delivery system 12 provides the interface between a water supply 14 and the chlorine dioxide generator 10. The water delivery system 12 conditions the water supply 14 and produces a water stream at an appropriate flow rate and pressure. In one presently preferred embodiment of the present invention, the water delivery system 12 may be configured to contain a system solenoid valve 16 and a high level solenoid valve 18. The system solenoid valve 16 may provide a fail-safe method of blocking off the inlet water flow. The system valve 16 may prevent inlet water from flowing through the system and diluting the chlorine dioxide previously generated. The high level solenoid valve 18 may detect when a certain quantity of chlorine dioxide has been generated and shut down the generator, thus stopping the inlet water flow and the generation of chlorine dioxide. If needed, a booster pump 20 may be incorporated into the water delivery system 12 in an effort to increase the pressure of the water flow delivered therethrough.

If the water supply 14 is feed at a sufficient pressure, the booster pump 20 may be omitted. As appreciated, the booster pump 20 may include any one of a number of conventional pumps and pump designs known in the art. The capacity of the booster pump 20 may be determined by the requirements of the chlorine dioxide generator 10. In one presently preferred embodiment of the present invention, the water supply 14 is feed into the water delivery system 12 at between 3–6 gpm with a minimum pressure of 30 psi. In general, the water pressure required to accomplish an efficient operation of the chlorine dioxide generator 10 is preferably at approximately 50 psi or greater over the backpressure produced by the system piping and the eductor.

The water delivery system 12 may be further configured to contain a safety mechanism to protect the hardware of the chlorine dioxide generator 10 if the water supply 14 fails to supply a sufficient amount of water feed. In one presently preferred embodiment, the safety mechanism may comprise an in-line flowswitch 22 that is interconnected electrically with a time delay relay (not shown). Preferably, a timer (not shown) may be actuated at the start of pump 20, if after a predetermined time has elapsed (e.g., 10 seconds) the flowswitch 22 has not been actuated, then a safety circuit (not shown) would preferably remove incoming voltage to the chlorine dioxide generation apparatus 10 of the present invention.

In addition, the water delivery system 12 of one presently preferred embodiment of the present invention may include a pressure reducing valve 24. The pressure reducing valve 24 is preferably set at approximately 50 psi, although it will be appreciated that the psi may be adjusted to accommodate the task at hand. The pressure of the water delivery system 12 effectively determines the gallon-per-minute of water that flows through the chlorine dioxide generator 10. Therefore, the pressure reducing valve 24 may be adjusted to the optimum flow for a given set of requirements established by the chlorine dioxide generator 10. In one presently preferred embodiment, the flow may be adjusted between 3–6 gpm, with a flow of about 4 gpm being preferred or recommended.

The flow rate of the water delivery system 12 may be monitored by the use of a flow meter 26, if desired. The flow meter 26 may be helpful as a reference guide for establishing the initial setup of the concentration of chlorine dioxide.

As will be appreciated by those skilled in the art, the water delivery system 12 may be further configured to contain any other necessary components that may be required to properly condition and control the water flow. In one presently preferred embodiment, a check valve 28 may be employed to ensure that the chlorine dioxide is unable to backfeed into the water delivery system 12 of the chlorine dioxide generator 10. Additionally, a pressure gauge 30 may be incorporated into the water delivery system 12 to monitor the water pressure for initial setup and to facilitate troubleshooting of the chlorine dioxide generator 10, as needed.

The water flow through the water delivery system 12 may be configured in such a manner so as to exit the water delivery system 12 by passing through an eductor 32. Preferably, the eductor 32 may be configured to create a vacuum. In one presently preferred embodiment of the present invention, the vacuum may be generated in the reaction column 110 which may be positioned proximate the eductor 32. The vacuum produced may be dependent upon selected flow rate and pressure of the water delivery system 12 and is approximately between 20–28 in.Hg.

The booster pump 20, pressure regulator 24, and water flow meter 26 may work in conjunction with each other to maintain constant pressure and water flow to the eductor 32. For example, a water supply 14 pressure of 10–60 psi at between about 4–6 gpm may be connected to the inlet side of the booster pump 20. In particular, the exact inlet water pressure is generally dependent upon the chlorine dioxide production rate and the induced backpressure at the discharge of the eductor 32. As a result, the pressure regulator 24 may be adjusted, on-site, to maintain a system pressure level of approximately 50 psi at 4 gpm. As will be appreciated by those skilled in the art, flow rates vary according to the size and capacity of the chlorine dioxide generator 10.

In one presently preferred embodiment of the present invention, a chemical feed system 40 is configured to communicate with the water delivery system 12 of the chlorine dioxide generator 10. Functionally, the chemical feed system 40 is responsible for delivering a plurality of reactants to a reaction column 110. The reactants to be delivered to the reaction column 110 may consist of any combination of chemicals which, when mixed, react to form a usable chlorine dioxide. The chemical feed system 40 may be further configured to provide an individual feed for each reactant. For example, in one presently preferred embodiment, the reactants include hydrochloric acid, sodium hypochlorite and sodium chlorite which are delivered to the water delivery system 12 by individual feed apparatus 50, 70, and 90 respectively.

The hydrochloric acid (HCl) feed apparatus 50 is preferably configured to dispense a volume of HCl to the reaction column 110. As will be appreciated, HCl may be held and delivered from any suitable container or holding tank. In one presently preferred embodiment of the present invention, HCl is held in a supply tank 52 and dispensed therefrom at a determinable volume. Controlled dispensing of HCl from the supply tank 52 may be accomplished by any suitable means such as pumping, gravity feed, or a combination of both. A check valve 54 may be inserted into the flow exit of the HCL supply tank 52 to ensure that flow propagates in only one direction. Specifically, a pump 56 may be configured to remove HCl from the supply tank 52 and deliver it to the reaction column 110. In one presently preferred embodiment of the present invention, the HCL reactant may be removed from the supply tank 52 by means of the combination of pumping with a gravity assist. That is, the pump 56 may be positioned at a location below the supply tank 52 in order to ensure proper gravity flow and flooding of the lines and to make the calibration of the chlorine dioxide generator 10 possible.

In certain preferred embodiments, the pump 56 may be a metering pump capable of precise adjustable volumetric displacement. The pump 56 may be further configured to operate in conjunction with a calibration tube 58. As appreciated by those skilled in the art, the calibration tube 58 may allow an operator to precisely adjust the pump 56 so as to produce a desired volumetric displacement of the flow of HCL reactant from the supply tank 52 to the reaction column 110.

In addition, the HCl feed apparatus 50 may be configured to include a respective four (4) function valve 60 that preferably maintains a backpressure (e.g., about 25 psi) to ensure repeatability of metering pump 56 priming, while also providing the option for degassing functions if required by the given application. A second backpressure regulator (not shown), preferably set at about 50 psi and directly coupled to the reaction column 110, may promote efficiency by reducing the distance the HCl is pumped. To this end, in one presently preferred embodiment of the present invention, each pulse from the chemical metering pump 56 delivers a predetermined amount of HCL through a flow path that has been calculated for optimum mixing characteristics.

Similar to the structural configuration of the HCl feed apparatus 50, a sodium hypochlorite (NaOCl) feed apparatus 70 is preferably configured to dispense a volume of NaOCl to the reaction column 110. As will be appreciated, NaOCl may be held and delivered from any suitable container or holding tank. In one presently preferred embodiment of the present invention, NaOCl is held in a supply tank 72 and dispensed therefrom at a predetermined volume. Controlled dispensing of NaOCl from the supply tank 72 may be accomplished by any suitable means such as pumping, gravity feed, or a combination of both. A check valve 74 may be inserted into the flow exit of the NaOCl supply tank 72 to ensure that flow propagates in only one direction. In particular, a pump 76 may be configured to remove NaOCl from the holding tank 72 and deliver it to the reaction column 110. In one presently preferred embodiment, the NaOCl reactant may be removed from the supply tank 72 by means of the combination of pumping with a gravity assist to ensure proper gravity flow and flooding of the lines and to make the calibration of the chlorine dioxide generator 10 possible.

In certain preferred embodiments, the pump 76 may be a metering pump capable of precise adjustable volumetric displacement. The pump 76 may be further configured to operate in conjunction with a calibration tube 78. As appreciated by those skilled in the art, he calibration tube 78 may allow an operator to precisely adjust the pump 76 so as to produce a desired volumetric displacement of the flow of NaOCl reactant from the supply tank 72 to the reaction column 110.

The NaOCl feed apparatus 70 may be configured to include a respective four (4) function valve 80 that preferably maintains a backpressure (e.g., about 25 psi) to ensure repeatability of metering pump 76 priming, while also providing the option for degassing functions if required by the given application. A second backpressure regulator (not shown), preferably set at about 50 psi and directly coupled to the reaction column 110, may promote efficiency by reducing the distance the NaOCl is pumped. To this end, in one presently preferred embodiment of the present invention, each pulse from the chemical metering pump 76 delivers a predetermined amount of NaOCl through a flow path that has been calculated for optimum mixing characteristics.

Similar to the structural configuration of the HCl feed apparatus 50 and the NaOCl fee apparatus 70, the chlorite ($NaClO_2$) feed apparatus 90 is preferably configured to dispense a volume of $NaClO_2$ to the reaction column 110. As will be appreciated, $NaClO_2$ may be held and delivered from any suitable container or holding tank. In one presently preferred embodiment of the present invention, $NaClO_2$ is held in a supply tank 92 and dispensed therefrom at a determinable volume. Controlled dispensing of $NaClO_2$ from the supply tank 92 may be accomplished by any suitable means such as pumping, gravity feed, or a combination of both. A check valve 94 may be inserted into the flow exit of the $NaClO_2$ supply tank 92 to ensure that flow propagates in only one direction. Specifically, a pump 96 may be configured to remove $NaClO_2$ from the supply tank 92 and deliver it to the reaction column 110. In one presently preferred embodiment of the present invention, the $NaClO_2$ reactant may be removed from the supply tank 92 by means of the combination of pumping with a gravity assist in order to ensure proper gravity flow and flooding of the lines and to make the calibration of the chlorine dioxide generator 10 possible.

In certain preferred embodiments, the pump 96 may be a metering pump capable of precise adjustable volumetric displacement. The pump 96 may be further configured to operate in conjunction with a calibration tube 98. As appreciated by those skilled in the art, the calibration tube 98 may allow an operator to precisely adjust the pump 96 so as to produce a desired volumetric displacement of the flow of $NaClO_2$ reactant from the supply tank 92 to the reaction column 110.

Additionally, the $NaClO_2$ feed apparatus 90 may be further configured to include a respective four (4) function valve 100 that preferably maintains a backpressure (e.g., about 25 psi) to ensure repeatability of metering pump 96 priming, while also providing the option for degassing functions if required by the given application. A second backpressure regulator (not shown), preferably set at about 50 psi and directly coupled to the reaction column 110, may promote efficiency by reducing the distance the $NaClO_2$ is pumped. To this end, in one presently preferred embodiment of the present invention, each pulse from the chemical metering pump 96 delivers a predetermined amount of $NaClO_2$ reactant through a flow path that has been calculated for optimum mixing characteristics.

Preferably, the metering pumps 56, 76, and 96 are interconnected through a repeat cycle timer (not shown) to insure that all pump pulsations are synchronize to occur at exactly the same time. The utilization of precision pump stroke synchronization insures that the reactant chemicals arrive at the reaction column 110 with matching volumetric surges. That is, the natural surges and pulses of the metering pumps 56, 76, and 96 create cycles in the amount of reactant that is present in the reaction column 110. If the pump surges are not synchronized, one reactant may arrive at the reaction column 110 in excess and not find enough of the complement reactant to react completely. Thus, the excess reactant will leave the reaction column 110 unreacted, and therefore wasted. By synchronizing the pump surges of the metering pumps 56, 76, and 96, the amounts of the reactants may vary, however, they will vary in parallel. In other words, when one reactant is present in a larger volume, so is the accompanying complementary reactant(s). Thus, neither reactant is limiting or in excess, and both may be consumed to completion.

Still referring to FIG. 1, after the mixture of all of the reactants has been properly accomplished in the reaction column 110, according to the teachings herein, the resulting chlorine dioxide may enter the output system 140 of the chlorine dioxide generator 10. The output system 140 may be configured to complement the given requirements for which the chlorine dioxide has been produced. In one presently preferred embodiment, the aqueous chlorine dioxide solution received from the reaction column 110 may be directed through a sight glass 142 for visual inspection by an operator. The flow of the chlorine dioxide solution may then pass through a check valve 144, thus ensuring a degree of safety by only allowing flow in a single direction. Preferably, the chlorine dioxide solution is then directed to a batch tank 146 where it remains until a controlling device (not shown) calls for its chemical delivery.

From the batch tank 146, the chlorine dioxide solution is preferably delivered by means of a check valve 148 to ensure one way flow. In one presently preferred embodiment, the output system 140 may be configured to include a delivery pump 150. A calibration tube 152 may also be connected along the length of the output system 140 to provide precise application of the chlorine dioxide, as desired. In addition, a sampling port (not shown) may be positioned in communication at the exiting point 154 at a point where the chlorine dioxide solution exits the chlorine dioxide generator 10. As appreciated, the sampling port may provide a method for quality control of the final product.

Figure 2:
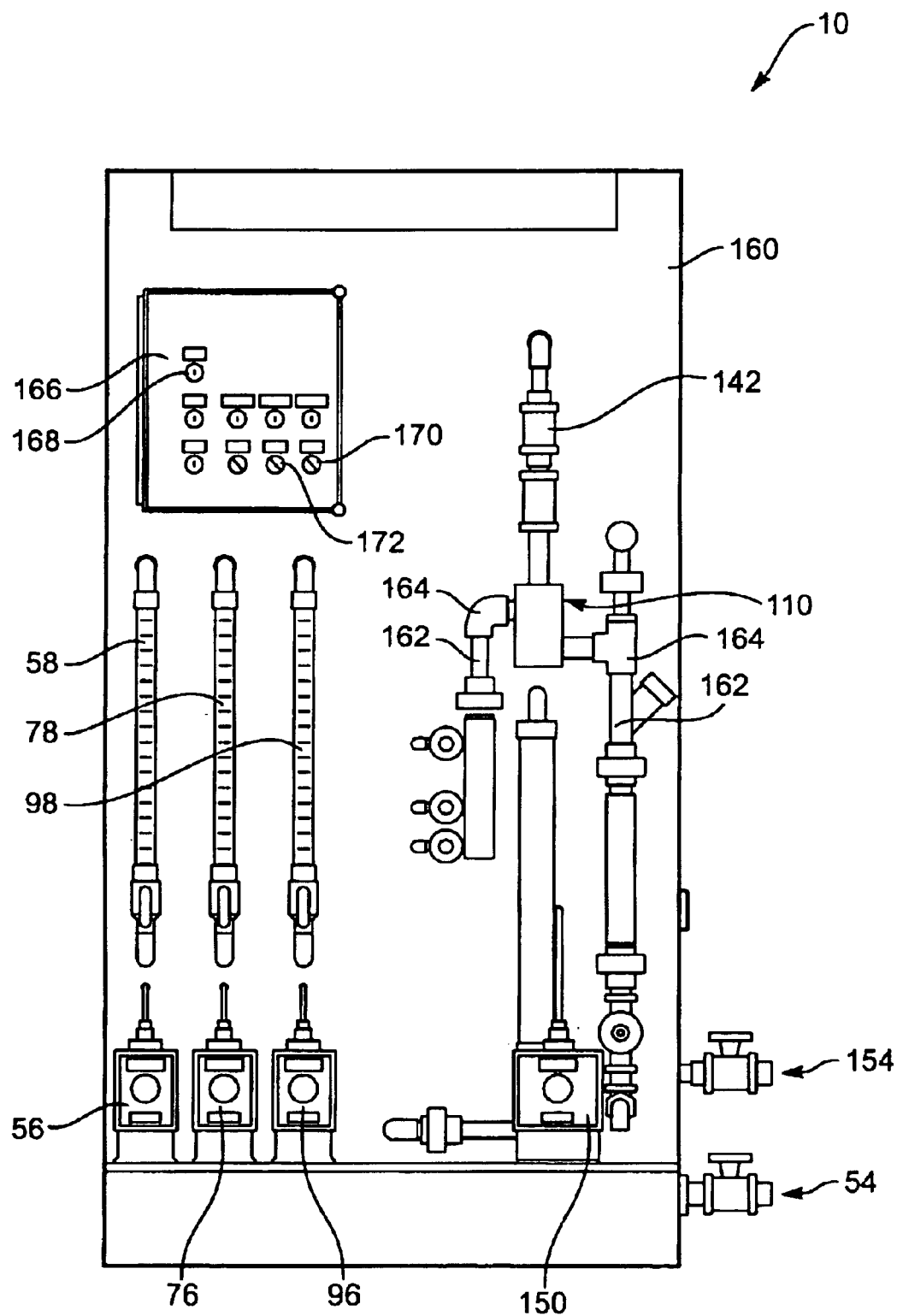
FIG. 2 is a front elevational view of one presently preferred embodiment of a chlorine dioxide generator of the present invention.
Figure 3:
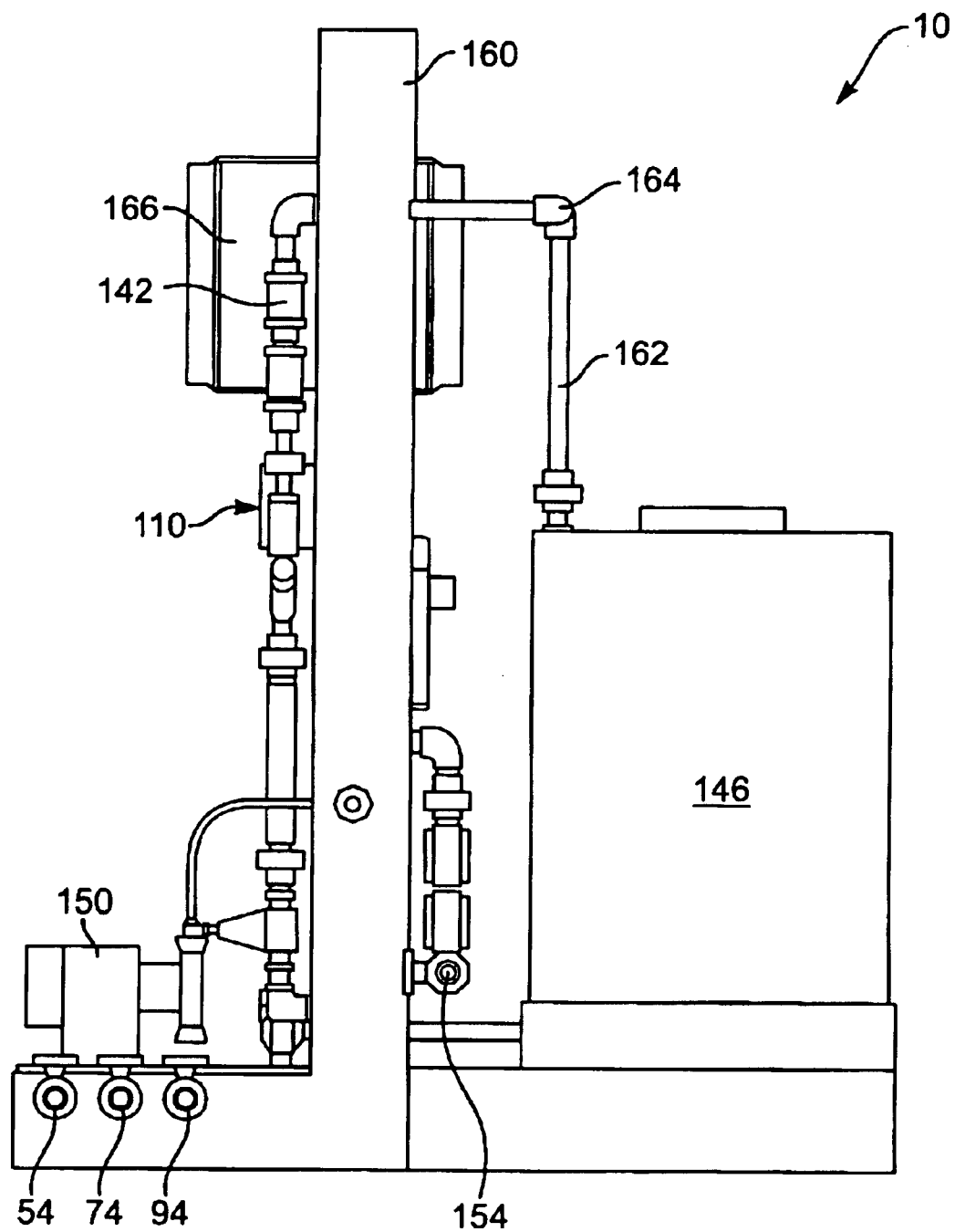
FIG. 3 is a side elevational view of one presently preferred embodiment of a chlorine dioxide generator of the present invention.

Referring now to FIGS. 2 and 3, the chlorine dioxide generator 10 of one presently preferred embodiment of the present invention is a self-contained system and all of the components necessary for chlorine dioxide generation may be mounted onto a primary support frame 160 and incorporate chemical resistant piping 162. The generator support frame 160 and the batch tank 146 may be constructed of polypropylene plastic because of the low reactivity with chlorine dioxide generating chemicals. All of the component parts of the chlorine dioxide generator 10 that are in contact with chlorine dioxide solution are preferably constructed of non-corrosive materials, such as by way of example and not by way of limitation, polypropylene, glass, PVC, or a non-corrosive metal. All piping 162 and valves 54, 74, 94 that are exposed to hydrochloric acid solution, sodium hypochlorite solution, chlorine gas (under vacuum conditions), sodium chlorite solution, and chlorine dioxide solution may be constructed from schedule 80 PVC, CPVC, or Teflon. To aid is the assembly of the component parts of the chlorine dioxide apparatus 10, the piping 162 may be furnished with sufficient unions 164 to permit easy assembly and disassembly.

As will be appreciated by those skilled in the art, all chemical reactants should be stored at ambient temperature in the range of between 4° C. and 40° C. For safety reasons, sodium chlorite must be isolated from sodium hypochlorite, and hydrochloric acid storage. The chemical feed metering pumps 56, 76, 96 may require a flooded suction because they may not be able to create enough suction to lift the reactants. Therefore, the chemical storage tanks 52, 72, 92 may be elevated above the top of the calibration cylinders 58, 78, 98 to ensure proper gravity flow and flooding of the lines so as to make the calibration of the chlorine dioxide generator 10 possible. To prevent the possibility of spillage and a reaction between the hydrochloric acid solution, the sodium hypochlorite solution, and the sodium chlorite solution, separate containers (not shown) may be installed to catch any overflow from the calibration tubes 58, 78, 98. In certain preferred embodiments of the present invention, the chemical feed lines 162 preferably utilize NPT type connections and are plumbed using Teflon tubing.

As discussed above, the present invention may incorporate an electrical fail-safe design that automatically stops system operation during no-flow or low-flow system conditions. Specifically, a system input flow system solenoid valve 16 and a flow switch 22 disposed along the length of the water delivery system 12 monitor flow conditions of the chlorine dioxide generator 10.

A motor starter module (not shown) may be utilized in the chlorine dioxide generator 10 to minimize excessive motor current loads as a result of booster pump 20 startup. Additionally, an on/off power switch 168 that is preferably located on the front of a generator electrical enclosure 166 permits operator power on and power off sequencing. In one presently preferred embodiment, when the chlorine dioxide generator 10 is operating under normal conditions, a green indicating light 170 is visible on the front of the electrical enclosure 166 that may be labeled "PUMP RUNNING" or with some other conventional indication.

Under no flow water conditions and/or pump motor overload conditions, one or more red indicating lights 172 may be disposed and visible on the front panel of the electrical controller unit 166. These indicators may be provided to inform the operator of a system problem. In operation, if any of the indicators 172 are illuminated, the chlorine dioxide generator 10 may be manually or electrically shutdown and the problem or system error evaluated prior to restarting the chlorine dioxide generator 10.

In one presently preferred embodiment of the present invention, the chlorine dioxide generator 10 operates from a 100-volt alternating current source and can be modified, as required, for a line frequency of either 50 Hz or 60 Hz, depending upon installation location. A transformer (not shown) may be configured to boosts the voltage to 120-volt AC to provide proper voltage to the components of the chlorine dioxide generator 10.

Figure 4:
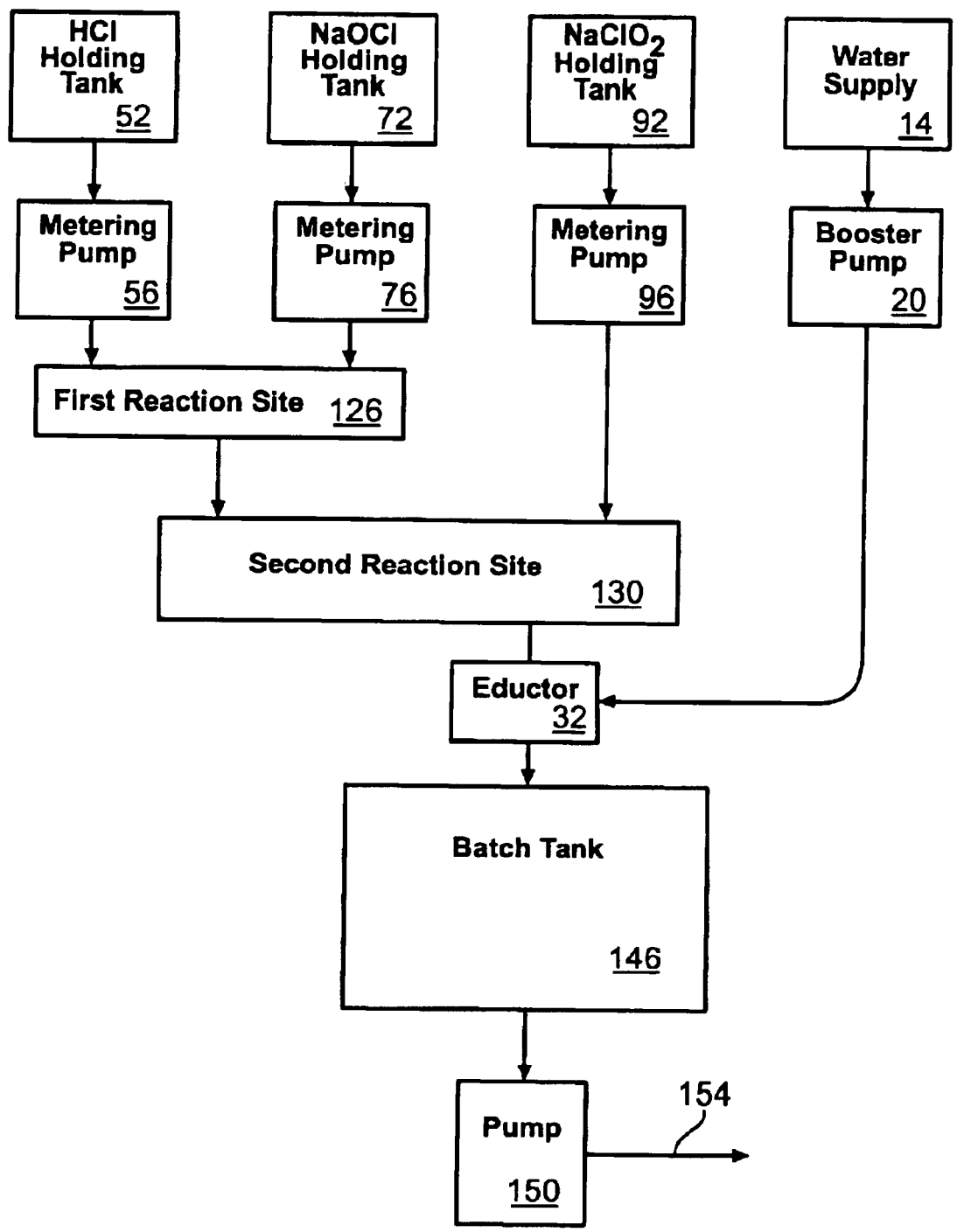
FIG. 4 is a conceptual flow chart of the presently preferred embodiment of the chlorine dioxide generation apparatus and method illustrated in FIG. 1.

Referring now to FIG. 4, a conceptual flow chart of the chlorine dioxide generation apparatus 10 is shown. In particular, FIG. 4 illustrates the order in which the chemical reactants (e.g., hydrochloric acid, sodium hypochlorite, and sodium chlorite) are introduced to one another within the reaction column 110. As discussed hereinabove, the reactants are pumped respectively from holding tanks 52, 72, 92 by chemical metering pumps 56, 76, 96, respectively. The chlorine dioxide generator 10 of one presently preferred embodiment of the present invention may be configured to control the production of chlorine dioxide by the manual adjustment of the three feedstock chemical reactant feed rates. Specifically, the feed rates of the reactant chemicals are regulated by their respective metering pumps 56, 76, 96.

In one presently preferred embodiment, a 15% hydrochloric acid by weight solution from supply tank 52 is delivered under pressure and in a synchronized combination with a 12.5% sodium hypochlorite by weight solution from supply tank 72 to a first reaction site 126. The two chemicals react according to the following formula:

$$NaOCl + 2HCl \rightarrow Cl_2 + NaCl + H_2O$$

The resulting chlorine gas ($Cl_2$) is then mixed with a chlorite solution from supply tank 92, in a second reaction site 130 according to the following reaction:

$$NaClO_2 + Cl_2 \rightarrow 2ClO_2 + 2NaCl$$

Chlorine dioxide ($ClO_2$) is generated in this two-stage reaction, whereas the complete reaction can be represented in one overall stoichiometric formula, as follows:

$$2NaClO_2 + NaOCl + 2HCl \rightarrow 2ClO_2 + 3NaCl + H_2O$$

As appreciated, those skilled in the art will readily recognize other possible ratios of chemical reactants are likewise suitable and consistent with the spirit and scope of the present invention. Thus, the percentages by weight ratios provided hereinabove are considered to be exemplary of one presently preferred embodiment of the present invention and not intended to be restrictive thereof.

The formation of chlorine dioxide is complete prior to the chlorine dioxide exiting the reaction column 110 and entering the eductor 32 and consequent mixing with the outlet water stream. The reaction of sodium chlorite with chlorine gas to form chlorine dioxide may take place under a vacuum and may be achieved without the use of any excess acid mineral feed over that required. Specifically, the vacuum may be produced by the eductor 32, as discussed hereinabove. The chlorine dioxide solution produced then preferably flows into the batch tank 146 where it may be dispensed on command by a pump 150 to a point of application 154. As appreciated by those skilled in the art, the apparatus and methods of the present invention may be configured and scaled to produce differing concentrations and quantities of chlorine dioxide in order to treat varying quantities of water and dependent upon the physical characteristics of the unit itself.

The knowledge of the chlorine dioxide demand of the water which is to be treated is critical to the ability to size a chlorine dioxide generator for a given plant application. In lieu of an actual chlorine dioxide demand test, it can be generally assumed that a dosage of 1.0–1.5 ppm will probably be sufficient to treat drinking water from most domestic sources when introduced near the rapid mix of the water plant. If the anticipated feed point is closer to the filters, the dosage will respectively be lower. Conversely, a feed to a raw water intake pipe may demand a larger dosage of chlorine dioxide.

It is preferable advantageous to run generating equipment in the upper range of its operating parameters. However, the chlorine dioxide generator 10 of the present invention contemplates an easy upsizing or downsizing should there be significant changes in the amount of chlorine dioxide required due to plant expansion or change in the water quality. Concentration may be changed by adjusting the output of the metering pumps 56, 76, and 96.

As appreciated by those skilled in the art, the need for "flow pacing" is the first consideration in selecting the right model of chlorine dioxide generator. If the plant has a large clearwell or is able to produce at a fairly constant rate (e.g., plant personnel are available to make manual changes to the chlorine dioxide dose or plant production changes are small, no more than +/−10%), along with a relatively stable chlorine dioxide demand, a manual system may be the most cost effective and appropriate system.

The flow-paced-batch system typically utilizes a standard manual chlorine dioxide generator to introduce chlorine dioxide solution to the batch holding tank. In one presently preferred embodiment, chlorine dioxide solution may then be pumped from the holding tank to the point of application via a 4–20 milli-amp flow pacing system. A major benefit of this type of adjustable system is its ability to provide efficient chlorine dioxide supply for those applications requiring low daily doses of chlorine dioxide and/or economical 4–20 milli-amp flow paced distribution.

The actual yield of the chlorine dioxide generator 10 can be demonstrated by an amperometric analysis of the product, capable of differentiating between chlorine, chlorine dioxide, clorite, and clorate. The theoretical yield may be determined from the feed rates of the reacting chemicals. The percent yield can then be calculated, the ratio of the actual yield to the theoretical yield, for the chlorine dioxide generation process.

Figure 5:
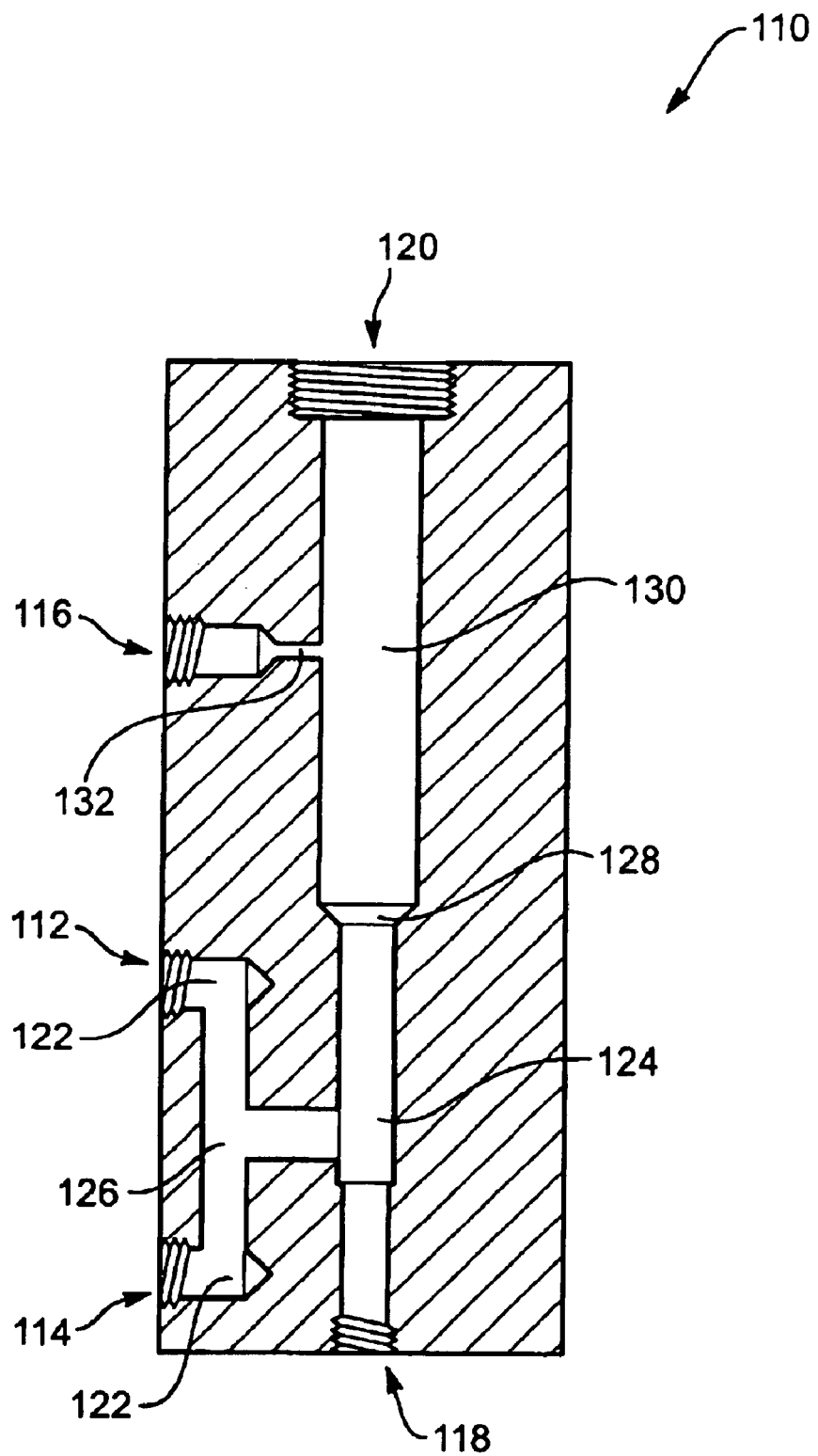
FIG. 5 is a cross-sectional view of one presently preferred embodiment of a reaction column of a chlorine dioxide generation apparatus of the present invention.

Referring to FIG. 5, a cross-sectional view of one presently preferred embodiment of the reaction column 110 is shown. Preferably, the reaction column 110 is configured to include a plurality of inlets and an outlet. In one presently preferred embodiment of the present invention, the reaction column may include a HCl inlet 112, a NaOCl inlet 114, a NaClO$_2$ inlet 116, a flushing inlet 118, and an outlet 120. The flushing inlet 118 may be included to facilitate cleaning and flushing of the generator system 10, if desired.

As appreciated by those skilled in the art, smooth flow paths promote laminar flow. Laminar flow occurs when fluid molecules are allowed to travel in a parallel motion with respect to each other. A fluid molecule in laminar flow only comes in contact with immediate neighbor molecules. Turbulent flow, on the other hand, creates a random and swirling motion of the fluid particles. In particular, turbulent molecules come in contact with many molecules in every extreme of the flow. As explained hereinabove, high molecular interaction is essential for generating a high percent yield. Therefore, a highly turbulent, mixing, swirling flow will promote a high percent yield. The reaction column 110 is therefore designed with a variety of geometries and configuration which promote turbulent flow.

One presently preferred embodiment of the reaction column 110, as shown in FIG. 5, may employ sharp corners 122 and abrupt direction changes 124, thus forcing a tumbling and turbulent flow. The reaction column 110 may also allow for a precisely controlled introduction of the reactants.

Preferably, the hydrochloric acid solution enters the reaction column through inlet port 112. A sodium hypochlorite may then be introduced through inlet port 114. As appreciated by those skilled in the art, the hydrochloric acid may have been introduced through inlet port 114 and sodium hypochlorite may have then been introduced through inlet port 112. However, for the sake of explanation, it is assumed that the hydrochloric acid and sodium hypochlorite solutions will enter the reaction column through inlet ports 112, 114, respectively, as stated above.

The hydrochloric acid and the sodium hypochlorite are preferably delivered in synchronized volumetric surges. The two reactants proceed into the reaction column 110 and preferably meet in a head-on collision at the first reaction site 126. The liquid fronts of the two chemicals tumble into each other, resulting in a high degree of turbulence, mixing and swirling. The two chemicals then react to form sodium chloride, water and chlorine gas. This method ensures consistent generation of gas versus liquid/gas combinations. The products of the first reaction travel through an expansion region 128 to the second reaction site 130. The time required to travel between the first reaction site 126 and the second reaction site 130 has been calculated through analytical tests to produce the time and mixture needed before moving to the next stage.

Sodium chlorite is introduced into the reaction column 110 at inlet port 116 using similar controlling devices as previously described hereinabove. Different nozzle geometries 132 may be used to provide a desired injection rate of the reactant. In one presently preferred embodiment, an injection nozzle 132 may converge to increase the velocity with which the sodium chlorite impinges on the sodium chloride, water, and chlorine gas at the second reaction site 130. The injection of the sodium chlorite is preferably controlled to increase turbulence and mixing as well to provide accurate dispensing of the reactant.

Upon exiting the reaction column 110 through port 120, the resulting products are introduced to a required amount of water, wherein all of the components blend together forming an aqueous chlorine dioxide solution having very low concentrations of unreacted reactants.

As will be appreciated by those skilled in the art, the reaction column 110 may be constructed of any material that has the necessary strength and resistance to chemical attack. In one presently preferred embodiment of the present invention, the reaction column 110 may be constructed of sch. 80 polyvinyl chloride (PVC).

Consistent with the foregoing, the present invention provides novel apparatus and methods for increasing the efficiency of chlorine dioxide production by means of utilizing metering pumps and a multiport reaction column with vacuum discharge, thereby precisely metering and synchronizing, via the repeat cycle timer, reactant introduction in an effort to achieve the maximum percent yield. Additionally, the present invention increases the efficiency of chlorine dioxide production at minimal cost and in a convenient size. Consistent with the foregoing, the present invention improves the chemical reaction due to precision volumes, linear flow paths, a reaction column and exact timing of precursor pump signal. In accordance therewith, the generation of chlorine dioxide is efficiently increased by the use of synchronization and chemical routing inside the reaction column.

The present invention may be embodied in other specific forms without departing from its spirit or essential characteristics. The described embodiments are to be considered in all respects only as illustrative, and not restrictive. The scope

What is claimed and desired to be secured by United States Letters Patent is:

1. An apparatus for chlorine dioxide generation, the apparatus comprising:
a plurality of metering pumps;
a reaction column having multiple inlet ports, selected inlet ports of the multiple inlet ports each being operably connected to a respective metering pump of the plurality of metering pumps; and
a synchronizer controlling the plurality of metering pumps to synchronize the pulsations of each metering pump of the plurality of metering pumps.

2. The apparatus of claim 1, the reaction column having a plurality of internal passages.

3. The apparatus of claim 2, wherein the reaction column comprises a first reaction site, a first internal passage of the plurality of internal passages connecting a first inlet port of the multiple inlet ports to the first reaction site, a second internal passage of the plurality of internal passages connecting a second inlet port of the multiple inlet ports to the first reaction site.

4. The apparatus of claim 3, further comprising a first reactant chemical flowing within the first internal passage and a second reactant chemical flowing within the second internal passage, the first and second internal passages shaped to promote mixing of the first and second reactant chemicals at the first reaction site.

5. The apparatus of claim 4, wherein the first and second internal passages promote mixing of the first and second reactant chemicals by providing at least one head on collision of the first and second reactant chemicals at the first reaction site.

6. The apparatus of claim 5, wherein the first and second internal passages further promote mixing of the first and second reactant chemicals by generating turbulent flow in reactant chemicals by providing abrupt changes in the flow path.

7. The apparatus of claim 6, wherein the reaction column comprises a second reaction site, a third internal passage of the plurality of internal passages connecting a third inlet port of the multiple inlet ports to the second reaction site, and a fourth internal passage of the plurality of internal passages connecting the first reaction site to the second reaction site.

8. The apparatus of claim 7, wherein the first reactant chemical and the second reactant chemical react at the first reaction site to form a first product.

9. The apparatus of claim 8, further comprising a third reactant chemical flowing within the third internal passage and wherein the third reactant chemical and the first product react at the second reaction site to form a second product.

10. The apparatus of claim 9, further comprising an eductor with a carrier fluid passing therethrough, wherein the eductor is connected to the reaction column to generate a vacuum at the first and second reaction sites.

11. The apparatus of claim 10, wherein the carrier fluid comprises water.

12. The apparatus of claim 1, wherein the synchronizer comprises a repeat cycle timer.

13. An apparatus for generating a selected chemical compound from multiple reactants, the apparatus comprising:
multiple reactants;
a plurality of metering pumps, each metering pump of the plurality of metering pumps being operably connected to deliver a reactant of the multiple reactants to a reaction column;
the reaction column comprising multiple inlet ports to receive the multiple reactants and a first reaction site where selected reactants of the multiple reactants are introduced to one another; and
a synchronizer operably connected to the plurality of metering pumps to control the pulsations of the plurality of metering pumps to provide a synchronized delivery of selected reactants of the multiple reactants to the reaction column.

14. The apparatus of claim 13, the reaction column further comprising:
a first conduit conducting a first reactant of the multiple reactants from a first inlet port of the multiple inlet ports to the first reaction site; and
a second conduit conducting a second reactant of the multiple reactants from a second inlet port of the multiple inlet ports to the first reaction site.

15. The apparatus of claim 14, the reaction column further comprising:
a second reaction site;
a third conduit conducting a third reactant of the multiple reactants from a third inlet port of the multiple inlet ports to the second reaction site; and
a fourth conduit conducting a mixture of the first and second reactants from the first reaction site to the second reaction site.

16. The apparatus as defined in claim 15, wherein the first, second, and third conduits are further configured to promote mixing of the multiple reactants.

17. The apparatus as defined in claim 16, wherein the first and second conduits promote mixing by providing a substantially head-on collision of the first and second reactants at the first reaction site.

18. The apparatus as defined in claim 17, wherein the first and second conduits promote mixing by generating turbulent flow in the first and second reactants through the use of abrupt, substantially right angle changes in the direction of flow.

19. The apparatus as defined in claim 18, wherein selected reactants of the multiple reactants react in a first reaction at the first reaction site and a second reaction at the second reaction site.

20. The apparatus as defined in claim 19, wherein the first and second reactants react at the first reaction site to form chlorine gas.

21. The apparatus as defined in claim 20, wherein the chlorine gas and the third reactant react at the second reaction site to form chlorine dioxide.

22. The apparatus as defined in claim 21, further comprising an eductor with a carrier fluid passing therethrough, the eductor connected to the reaction column to generate a vacuum at the first and second reaction sites.

23. The apparatus as defined in claim 22, wherein the carrier fluid comprises water.

24. The apparatus as defined in claim 13, wherein the synchronizer comprises a repeat cycle timer.

* * * * *

UNITED STATES PATENT AND TRADEMARK OFFICE
CERTIFICATE OF CORRECTION

PATENT NO. : 6,855,294 B2  
DATED : February 15, 2005  
INVENTOR(S) : Rodney D. Taylor It is certified that error appears in the above-identified patent and that said Letters Patent is hereby corrected as shown below:

Column 2,  
Line 25, please delete "disadvantageous", and insert therefor -- disadvantages --.

Column 6,  
Lines 53 and 60, please delete "feed", and insert therefor -- fed --.

Column 9,  
Line 14, please delete "he", and insert therefor -- the --.  
Line 35, please delete "fee", and insert therefor -- feed --.

Column 10,  
Line 14, please delete "synchronize", and insert therefor -- synchronized --.

Column 11,  
Line 11, please delete "is", and insert therefor -- in --.  
Line 67, please delete "boosts", and insert therefor -- boost --.

Signed and Sealed this

Seventh Day of June, 2005

JON W. DUDAS  
*Director of the United States Patent and Trademark Office*